United States Patent
Cahana et al.

(10) Patent No.: US 10,521,447 B2
(45) Date of Patent: Dec. 31, 2019

(54) CONTAINER APPLICATION EXECUTION USING IMAGE METADATA

(71) Applicant: International Business Machines Corporation, Armonk, NY (US)

(72) Inventors: Zvi Cahana, Nahariya (IL); Etai Lev-Ran, Nofit (IL); Idan Zach, Givat Ela (IL)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 15/350,121

(22) Filed: Nov. 14, 2016

(65) Prior Publication Data

US 2018/0137174 A1    May 17, 2018

(51) Int. Cl.
    *G06F 17/30* (2006.01)
    *G06F 16/25* (2019.01)
    *G06F 9/455* (2018.01)

(52) U.S. Cl.
    CPC ............ *G06F 16/252* (2019.01); *G06F 9/455* (2013.01)

(58) Field of Classification Search
    CPC .............................. G06F 16/252; G06F 9/455
    USPC ........................................................ 717/120
    See application file for complete search history.

(56) References Cited

U.S. PATENT DOCUMENTS

| | | | |
|---|---|---|---|
| 9,348,622 B2 | 5/2016 | Emelyanov et al. | |
| 2007/0083380 A1* | 4/2007 | Martinez ................ | G06F 21/10 705/26.1 |
| 2008/0140433 A1* | 6/2008 | Levy ........................ | G06F 21/10 705/26.1 |
| 2008/0229280 A1* | 9/2008 | Stienhans ................. | G06F 8/34 717/107 |
| 2008/0269931 A1* | 10/2008 | Martinez ................. | G06F 21/10 700/94 |
| 2014/0195663 A1* | 7/2014 | Hirschenberger .... | H04W 4/003 709/223 |
| 2015/0205877 A1* | 7/2015 | Rhoads .................... | G06F 21/10 707/723 |
| 2015/0269194 A1* | 9/2015 | King .................... | G06F 9/44505 707/805 |
| 2015/0332479 A1* | 11/2015 | Gershon ............. | G06F 16/5838 382/164 |
| 2016/0162320 A1 | 6/2016 | Singh et al. | |

(Continued)

FOREIGN PATENT DOCUMENTS

WO      2015171030      11/2015

OTHER PUBLICATIONS

Tyler Harter., "Slacker: Fast Distribution with Lazy Docker Containers", 14th USENIX Conference on File and Storage Technologies, Feb. 22-25, 2016.

(Continued)

*Primary Examiner* — John Q Chavis
(74) *Attorney, Agent, or Firm* — Barry Blount

(57) ABSTRACT

An example system and method includes a processor to receive an image ID corresponding to a container image of a container to be run. The processor is to also send the image ID to a registry. The processor is also to receive an image metadata corresponding to the image ID from the registry. The processor is to store the image metadata on a local file system. The processor is to generate a container comprising an application. The processor is to execute the application using the image metadata.

17 Claims, 9 Drawing Sheets

(56) References Cited

U.S. PATENT DOCUMENTS

2016/0179509 A1    6/2016  Raghavan et al.
2016/0188639 A1*   6/2016  Levy ..................... G06F 21/10
                                                           707/803

OTHER PUBLICATIONS

Dirk Merkel., "Docker: Lightweight Linux Containers for Consistent Development and Deployment", Linux Journal archive, vol. 2014 Issue 239, Mar. 2014.

* cited by examiner

300

CONTAINER APPLICATION EXECUTION USING IMAGE METADATA

BACKGROUND

The present techniques relate to executing container applications. More specifically, the techniques relate to executing container applications using image metadata.

SUMMARY

According to an embodiment described herein, a system can include a processor to receive an image ID corresponding to a container image of a container to be run. The processor can also further send the image ID to a registry. The processor can also receive an image metadata corresponding to the image ID from the registry. The processor can further store the image metadata on a local file system. The processor can then generate a container comprising an application. The processor may further also execute the application using the image metadata.

According to another embodiment described herein, a method can include receiving, via a processor, an image ID corresponding to a container image of a container to be run. The method can also further include sending, via the processor, the image ID to a registry. The method can also include receiving, via the processor, an image metadata corresponding to the image ID from the registry. The method can include storing, via the processor, the image metadata on a local file system. The method can also include generating, via the processor, a container comprising an application. The method can further include executing, via the processor, the application using the image metadata.

According to another embodiment described herein, a computer program product for execution of container applications can include computer-readable storage medium having program code embodied therewith. The computer readable storage medium is not a transitory signal per se. The program code is executable by a processor to cause the processor to receive an image ID corresponding to a container image of a container to be run. The program code can also cause the processor to send the image ID to a registry. The program code can also cause the processor to receive an image metadata corresponding to the image ID from the registry. The program code can also cause the processor to store the image metadata on a local file system. The program code can also cause the processor to also further generate a container comprising an application. The program code can also cause the processor to execute the application using the image metadata.

DETAILED DESCRIPTION

Figure 1:
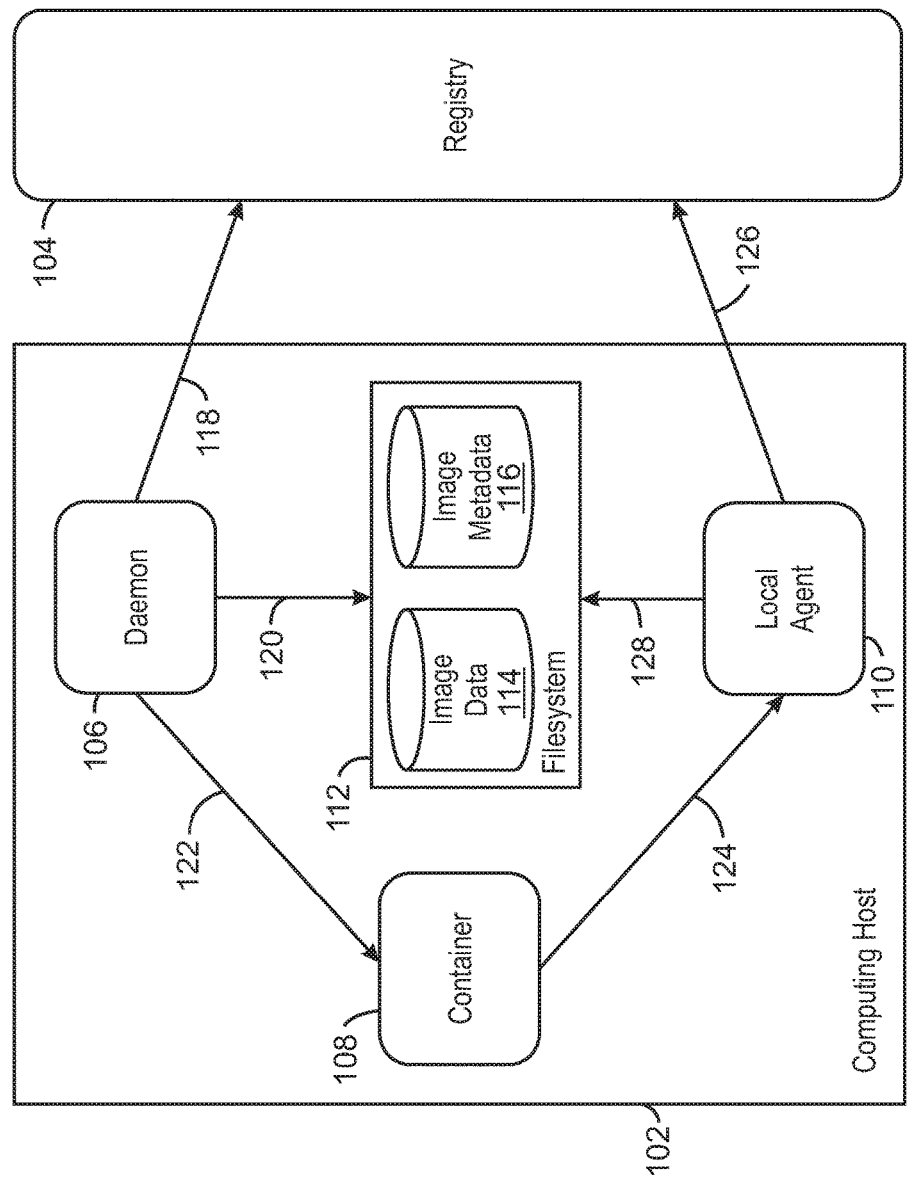
FIG. 1 is a block diagram of an example system that can execute container applications using image metadata.

Vendors may currently provide Containers as a Service (CaaS) to their customers, including the ability to store and run container images. However, container startup times can be significant, especially in use cases where container execution is constrained. Whereas initialization of network, compute and memory resources is relatively fast and simple, a containerized application requires a fully initialized file system, containing application binaries, and possibly a complete operating system distribution with full package dependencies. Thus, deploying a container in a container daemon service typically involves significant copying and initialization overheads. Moreover, a simulation that analyzed various different container workloads and measured the time from when deployment begins until a container is ready to start doing useful work showed that copying package data accounts for a majority of container startup time, but a small portion of the copied data may be actually needed for containers to being useful work. Thus, significant resources and time may be wasted copying data that may not be useful.

According to embodiments of the present techniques a system may include a processor to receive an image ID corresponding to a container image of a container to be run. The processor can send the image ID to a registry. The processor can then receive an image metadata corresponding to the image ID from the registry. The processor can further store the image metadata on a local file system. The processor may then generate a container including an application. The processor can then execute the application using the image metadata. For example, the processor can read the image metadata on the local file system. In some examples, the processor may detect that a range of data corresponding to the application is missing based on the image metadata. For example, the processor may prefetch data for executing the application. In some examples, the processor may access image data on-demand using the image metadata. The processor may then send a request for the range of data to the registry. For example, the range of data may be a portion of an image to be used by the application. The processor can then receive image data corresponding to the range of data from the registry. In some examples, the processor may then store the image data corresponding to one or more ranges of an image under the image ID in the local file system. The processor can then execute the application using the image data. In some examples, the application may be executed using the one or more ranges of the image. For example, the processor can execute the application using partial or whole image data. In some examples, the processor may execute the application based on the image metadata, data, and previous application file system accesses. Thus, the present techniques enable containers to be generated and container applications to be executed without container images needing to be completely downloaded to local storage beforehand. Furthermore, the present techniques may include smart prefetch based on detected access patterns, compression of files, and parallel downloading of files. Thus, the present techniques may enable more efficient transfer of container images for use in executing container applications and significantly improved container startup times. Moreover, the present techniques are not based on centralized storage and allow separated storage for registries and workers. Furthermore, the techniques are able to integrate with advanced policies for prefetching useful blocks on startup and propagating changes efficiently back to the remote storage registry. In some examples, container images can be uploaded by the developers to the storage registry, then users can download the container images from the storage registry and create containers locally on their machines.

In some scenarios, the techniques described herein may be implemented in a cloud computing environment. As discussed in more detail below in reference to at least FIGS. 6, 7, and 8, a computing device configured to execute container applications using image metadata may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 is a block diagram of an example system that can execute container applications using image metadata. The system is generally referred to using the reference number 100 and can be implemented at least in part using the computing device 600 of FIG. 6 below.

The example system 100 includes a computing host 102 commutatively coupled to a registry 104. For example, the computing host 102 may be a physical server or a virtual server. The registry 104 may be a server that stores image data and image metadata corresponding to one or more container images. The computing host 102 includes a daemon 106, a container 108, a local agent 110, and a local file system 112. The local file system 112 includes image data 114 and image metadata 116.

In the example system 100, a daemon 106 may receive an instruction to start a container. The daemon 106 may retrieve image metadata 116 from the registry 104 as shown by arrow 118. For example, the daemon 106 may attempt to pull a container image from the registry 104 using an image ID corresponding to the container image. Instead of returning the container image, the registry 104 provides the daemon 106 image metadata 116. The image metadata 116 may correspond to the container image associated with the container to be started. The image metadata 116 may include, for example, file names, sizes and hash-codes of the files' content that form the container image. The daemon 106 may then store the image metadata 116 in the local file system 112. The daemon 106 may then generate a container 108 as indicated by an arrow 122. For example, the container 108 may be generated to execute an image corresponding to the image metadata 116. The daemon 106 may then setup an associated network. For example, the network may be setup based on the operating system. The container 108 may then attempt to access a file associated with the metadata 116 as indicated by an arrow 124. For example, the daemon 106 may run a containerized application in the container 108 that accesses the file. The local agent 110 may detect that the file is not available in the local file system 112 and download the image data 114 from the registry as indicated by an arrow 126. For example, the local agent 110 may download the range that is needed for the container. In some examples, the range may be an exact byte range or a collection of file system blocks encompassing the accessed byte range. In some examples, the range may be an entire file. The local agent 110 may then store and later fetch the image data 114 from the file system 112 as indicated by an arrow 128. For example, the image 114 may be cached in the local file system 112 for later use. In some examples, the local agent 110 may perform pre-fetching of blocks in the background to retrieve image data to be used in the near future. For example, the local agent 110 may perform a smart pre-fetch for the whole file or files in the background based on previous runs or access patterns. For example, the local agent 110 may perform a read ahead based on observed sequential file access. In some examples, the local agent 110 may prefetch the image data 114 using any known pre-fetch method. For example, the local agent 110 may prefetch the image data 114 based on size, based on time, based on distribution, based on free network resources, etc. The container 108 may then access the image data 114 from the local file system 112 via the local agent 110.

In some examples, the file system may be managed by an agent and exposed to the daemon 106 and container 108 as a file system directory. The file system directory abstraction may be made possible via the existing utilities such as a File in User Space (FUSE) file system, loopback NFS server, or a kernel file system module. In some examples, the local agent 110 may allow sharing files across different images because different container images may contain the same files. For example, utilities may be associated with the same files in different operating system releases. In such cases, the same files may normally be copied and pulled and pushed multiple times from and to the registry 104. Instead, the local agent 110 may pull or push the file once by using additional metadata to detect that the same file is used across different layers or across different images. For example, each image may be composed of one or more layers. In some examples, the additional metadata may be a hash-code on the file data. In some examples, given appropriate interfaces between the remote registry and components running on the host, the local agent 110 may apply delta and byte-level compression to blocks transferred between the computing host 102 and the registry 104. For example, the transfer between the registry 104 and the computing host 102, in either image pull or push, may be compressed in a multitude of ways. In some examples, one of several delta compression methods may be applied. For example, the compression may take into account a relation between versions of data known to be present in both locations. In some examples, any remaining bytes may be compressed using byte level compression techniques. For example, remaining bytes may be compressed using Lempel-Ziv (LZ) compression.

In some examples, the local agent 110 may enable cross container image file sharing. For example, if multiple container images contain the same file, the file may be stored multiple times in the registry and may be pulled multiple times from the registry when the container image is pulled by the local agent 110. Further, in some examples, different container images may contain the same files. Thus, the local agent 110 may detect that different container images contain the same file and pull only a single instance of the file. For example, when the local agent 110 retrieves an image data 114 from the registry, the local agent 110 may add a signature for each file including file path in the image that identifies the file data to the image meta-data. For example, the signature may be a hash-code or any other valid signature. The local agent 110 may save the hash-code on the local file system when the image data 114 is saved. Then, when the local agent 110 attempts to read a 1st block of data from a file, the local agent 110 may check whether a file with the same hash-code was already pulled and stored locally for a different image ID. If a file with the same hash-code was already pulled and stored locally for a different image ID, then the local agent 110 may read the block from that image or from some other generic location on the local file system and return it to the daemon. If not, the local agent 110 may continue to download the block the registry 104. In that case, the local agent 110 may mark in a global data-structure that a file with this hash-code is stored under the current image ID or at any other location on the local file system, so future accesses to this file may be served locally. In some examples, the local agent may download image blocks from one or more sources in parallel. For example, the local agent may download image blocks from multiple remote sources in a manner similar to peer-to-peer downloads. For example, the remote sources may include caches, registries, or other hosts storing the same blocks.

In some examples, the local agent 110 may include an access prefetch feature. For example, the local agent 110 may monitor and collect access information for files within an image. In some examples, the local agent 110 may monitor file access and provide data to satisfy the file accesses. For example, the local agent may monitor access to a collection of blocks or byte ranges from one or more files. In some examples, the local agent 110 may communicate with the remote registry to transfer image data and access information. For example, the collected information may be sent to a central entity to facilitate further analysis. For example, the central entity may coalesce access patterns from different hosts, determine access patterns based on file paths and/or types, etc. In some examples, the collected information can be added to the image metadata, or stored separately. The collected information can then be made available to local agents upon request, speeding first time access to files data by prefetching relevant ranges from the registry.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional computing hosts, containers, drivers, registries, file systems, etc.).

Figure 2:
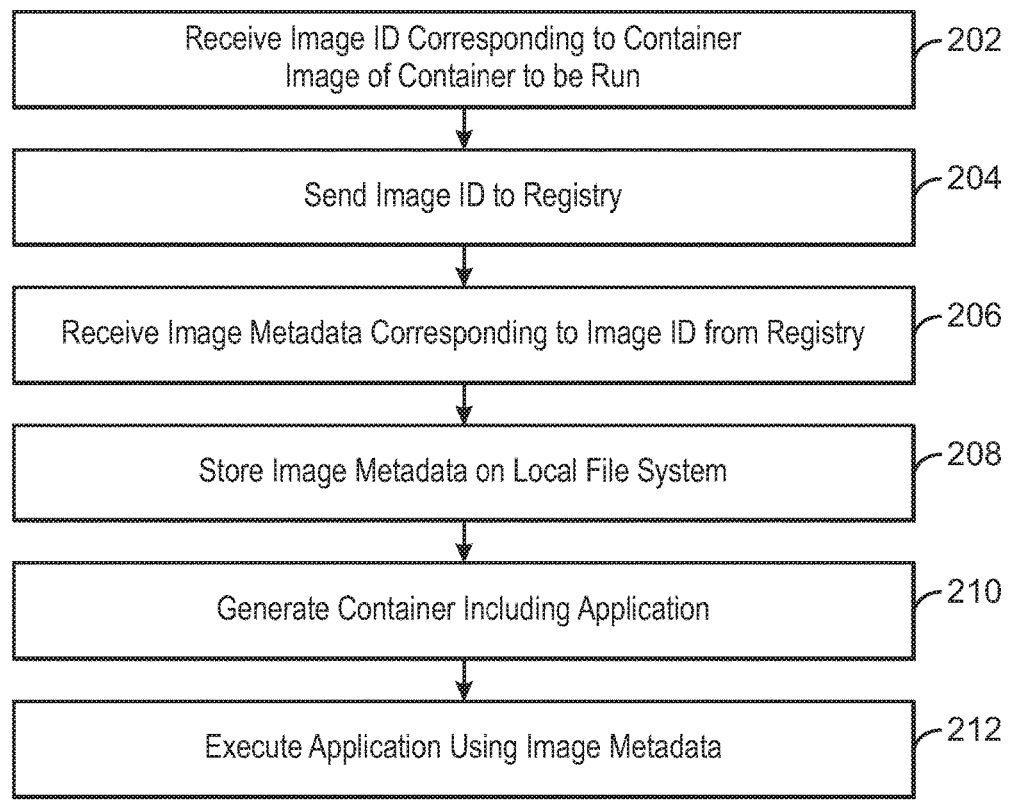
FIG. 2 is a detailed process flow diagram of an example method for executing container applications using image metadata.

FIG. 2 is a process flow diagram of an example method for executing container applications using image metadata. The process 200 can be implemented with any suitable computing device, such as the computing device 600 of FIG. 6. For example, the process can be implemented at least partially via the processor 602 of computing device 600.

The process 200 may begin at 202, where a processor receives an image ID corresponding to a container image of a container to be run. In some examples, the image ID may be a global unique ID of the image. For example, the image ID can be a string of 256 bits of random data.

At block 204, the processor sends the image ID to a registry. For example, the image ID may correspond to a container image to be pulled from the registry.

At block 206, the processor receives an image metadata corresponding to the image ID from the registry. For example, the metadata may include file names, sizes and hash-codes of the files' content that make up a container image.

At block 208, the processor stores the image metadata on a local file system. For example, the image metadata may be saved under the image ID.

At block 210, the processor generates a container including an application. For example, the application may correspond to a container functionality.

At block 212, the processor executes the application using the image metadata. In some examples, the processor may detect that a range of data is missing in the local file system and retrieve the missing data from the registry accordingly. For example, the processor may execute the application using the method 300 of FIG. 3 below. In some examples, the processor may execute the application using the method 400 of FIG. 4 below. For example, the processor may detect that a file is missing from the local file system but that a second file having a matching signature may be used instead.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the processor may prefetch a range of image data based on access patterns as described in the example method 500 of FIG. 5 below. Additionally, in some examples, the processor may update the container image. For example, during the course of an application execution, the application may write to the local file system, effectively changing the locally cached container image. These changes can be explicitly "committed" by the container's user, in which case a new container image version will be stored in the registry. In some examples, the changes can be collected locally until such time that the user decides to commit the changes. The changes can then be discarded upon container termination or streamed as they occur to the origin for safe keeping. In some examples, container updates can be controlled by an administrator policy. For example, the administrator may indicate that changes are not to be propagated if images are considered read-only. When to stream may be a tradeoff of commit time vs bandwidth usage. Thus, continuous streaming can smoothen bandwidth requirements over time.

Figure 3:
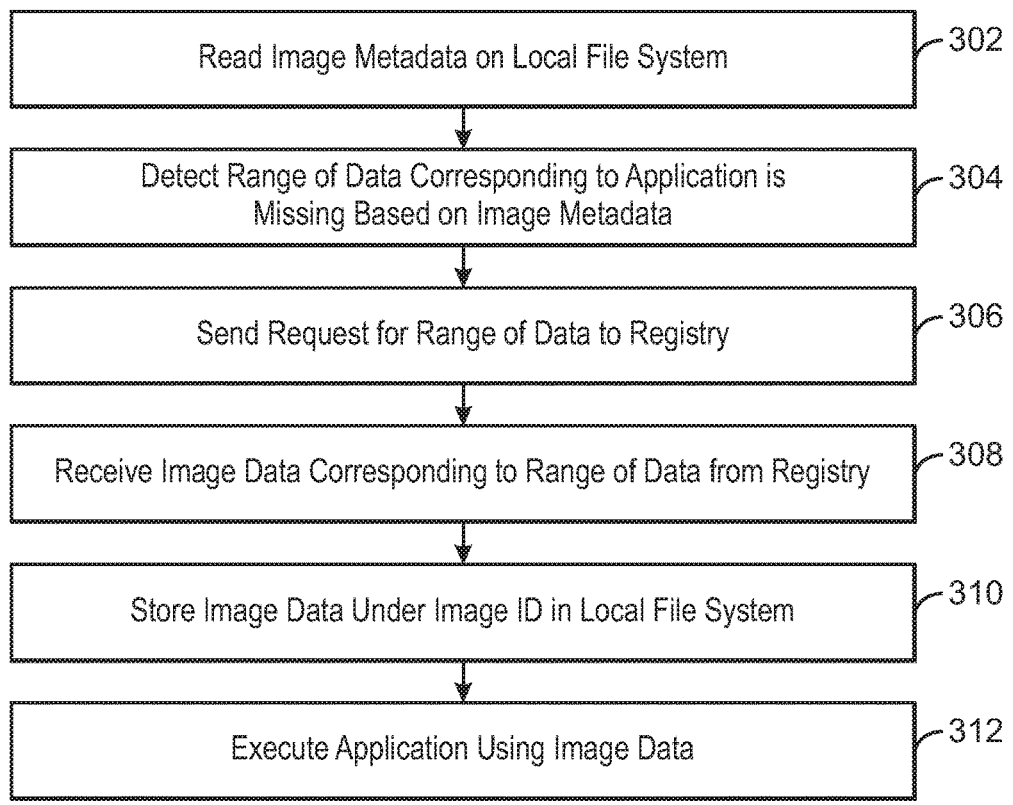
FIG. 3 is a process flow diagram of an example method for executing container applications using image data.

FIG. 3 is a process flow diagram of an example method for executing container applications using image data. The method 300 can be implemented with any suitable computing device, such as the computing device 600 of FIG. 6. For example, the method can be implemented via the processor 602 of computing device 600.

At block 302, a processor reads the image metadata on the local file system. For example, the metadata may include file names, sizes and hash-codes of the files' content that make up a container image.

At block 304, the processor detects that a range of data corresponding to the application is missing based on the image metadata. For example, the processor may detect that one or more files with particular names and size are missing from the local file system. In some examples, the processor may also detect that no file exists with the same hash code on the local file system.

At block 306, the processor sends a request for the range of data to the registry. For example, the range may be an exact byte range or a collection of file system blocks encompassing the accessed byte range.

At block 308, the processor receives image data corresponding to the range of data from the registry. For example, the image data may include one or more files corresponding to an application to be run on a container.

At block 310, the processor stores the image data under the image ID in the local file system. For example, files from a particular container image may all be stored under the same image ID.

At block 312, the processor executes the application using the image data. For example, the processor may access the image data from the local file system to execute the application. In some examples, a container functionality corresponding to the application may be exported to users via an external application programming interface (API), such as a remote API.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the processor may execute the application based on application file system accesses. The processor may prefetch image data based on access patterns as described in FIG. 5 below.

Figure 4:
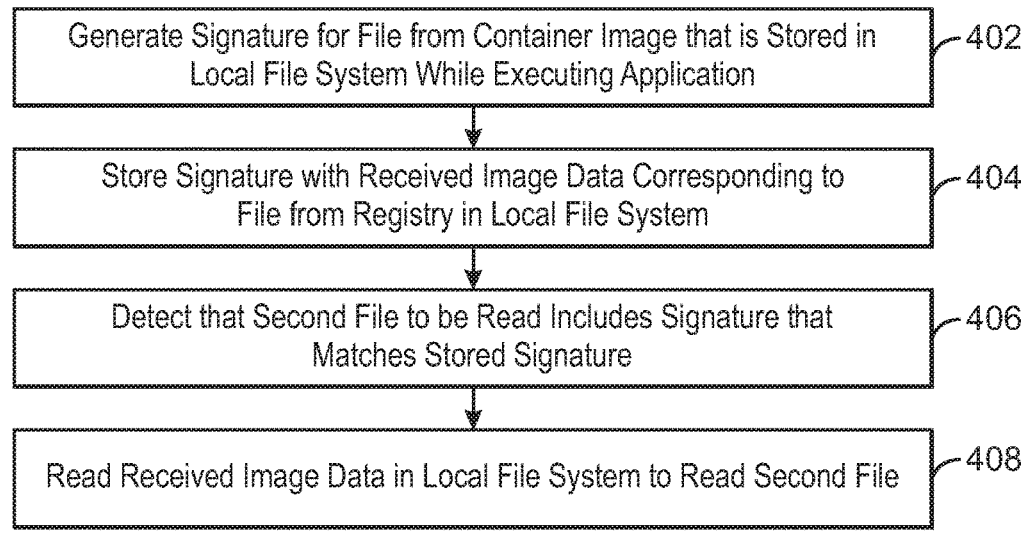
FIG. 4 is a process flow diagram of an example method for sharing file access across container images.

FIG. 4 is a process flow diagram of an example method for sharing file access across container images. The method 400 can be implemented with any suitable computing device, such as the computing device 600 of FIG. 6. For example, the method can be implemented via the processor 602 of computing device 600.

At block 402, a processor generates a signature for a file from the container image that is stored in the local file system while executing the application. For example, the signature may be a hash code or any other suitable form of unique signature.

At block 404, the processor stores the signature with received image data corresponding to the file from the registry in the local file system. For example, the signature may be a hash code that is saved in the local file system when the image data is saved.

At block 406, the processor detects that a second file to be read includes a signature that matches the stored signature. For example, a hash code of the second file may match the hash code of a file that is already stored in the local file system.

At block 408, the processor reads the received image data in the local file system to read the second file. For example, instead of detecting that the second file has not been saved to the local file system and retrieving the second file from the registry, the processor may instead retrieve the image data corresponding to the file having the matching hash code. Thus, time and resources may be saved by not having to retrieve the second file from the remote registry.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
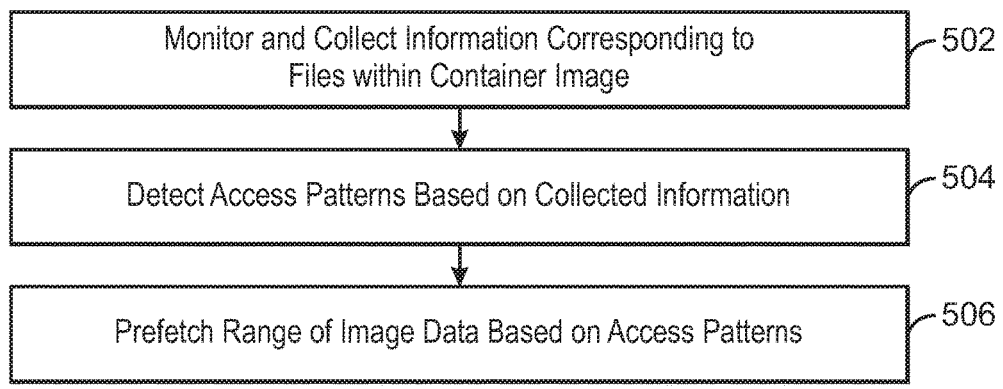
FIG. 5 is a process flow diagram of an example method for prefetching a range of image data based on access patterns.

FIG. 5 is a process flow diagram of an example method for prefetching a range of image data based on access patterns. The method 500 can be implemented with any suitable computing device, such as the computing device 600 of FIG. 6. For example, the method can be implemented via the processor 602 of computing device 600.

At block 502, a processor monitors and collects information corresponding to files within the container image. For example, the information may include a collection of blocks or byte ranges accessed from one or more files.

At block 504, the processor detects access patterns based on the collected information. For example, the processor may coalesce access patterns from different hosts or determine access patterns based on file paths and/or types. In some examples, the processor may send the collected information to a central server for analysis and receive detected access patterns from the central server.

At block 506, the processor prefetches a range of image data based on the access patterns. For example, the processor may prefetch relevant ranges for a container from the registry based on the access patterns.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
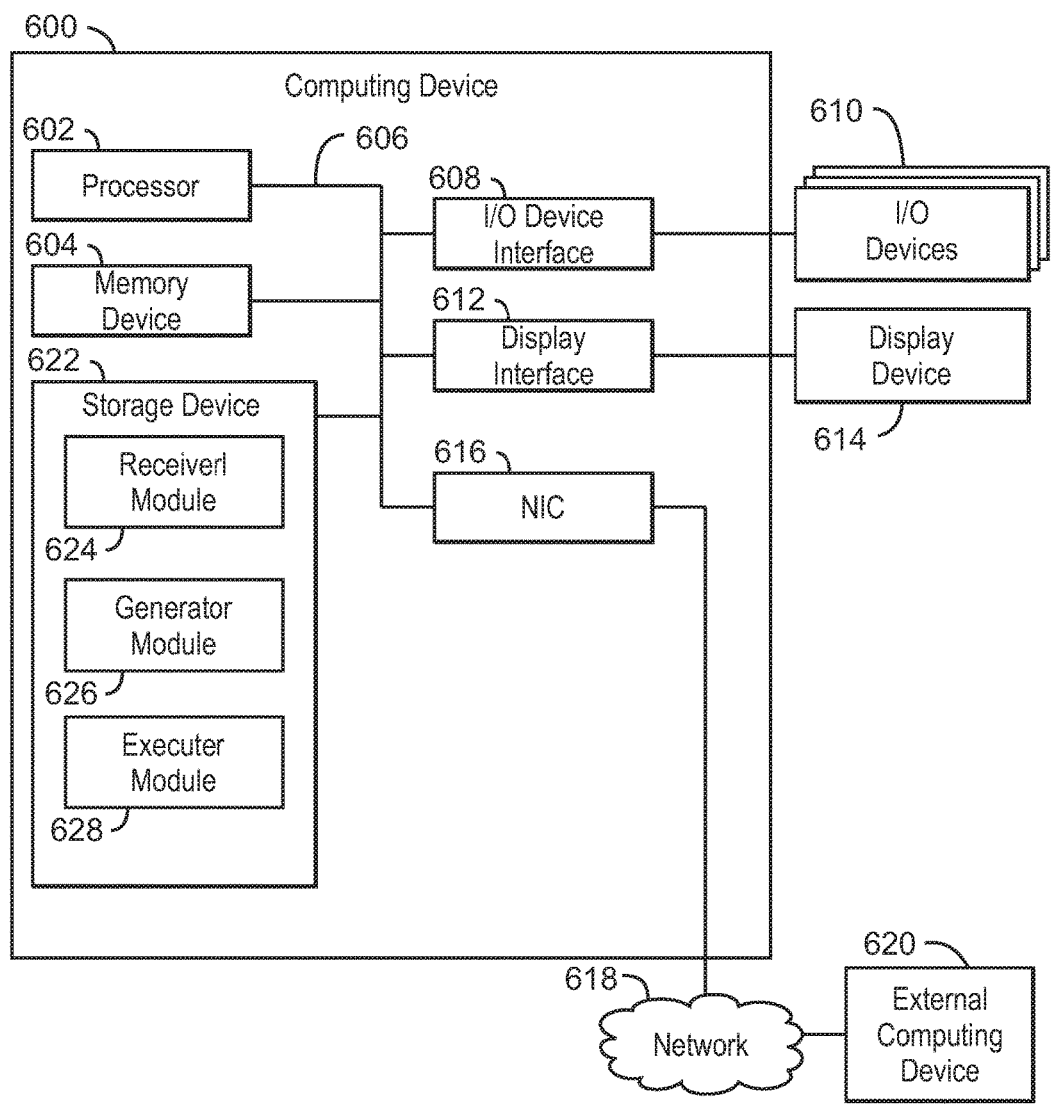
FIG. 6 is a block diagram of an example computing device that can execute container applications using image metadata.

With reference now to FIG. 6, an example computing device can execute container applications using image metadata. The computing device 600 may be for example, a server, desktop computer, laptop computer, tablet computer, or smartphone. In some examples, computing device 600 may be a cloud computing node. Computing device 600 may be described in the general context of computer system executable instructions, such as program modules, being executed by a computer system. Generally, program modules may include routines, programs, objects, components, logic, data structures, and so on that perform particular tasks or implement particular abstract data types. Computing device 600 may be practiced in distributed cloud computing environments where tasks are performed by remote processing devices that are linked through a communications network. In a distributed cloud computing environment, program modules may be located in both local and remote computer system storage media including memory storage devices.

The computing device 600 may include a processor 602 that is to execute stored instructions, a memory device 604 to provide temporary memory space for operations of said instructions during operation. The processor can be a single-core processor, multi-core processor, computing cluster, or any number of other configurations. The memory 604 can include random access memory (RAM), read only memory, flash memory, or any other suitable memory systems.

The processor 602 may be connected through a system interconnect 606 (e.g., PCI®, PCI-Express®, etc.) to an input/output (I/O) device interface 608 adapted to connect the computing device 600 to one or more I/O devices 610. The I/O devices 610 may include, for example, a keyboard and a pointing device, wherein the pointing device may include a touchpad or a touchscreen, among others. The I/O devices 610 may be built-in components of the computing device 600, or may be devices that are externally connected to the computing device 600.

The processor 602 may also be linked through the system interconnect 606 to a display interface 612 adapted to connect the computing device 600 to a display device 614. The display device 614 may include a display screen that is a built-in component of the computing device 600. The display device 614 may also include a computer monitor, television, or projector, among others, that is externally connected to the computing device 600. In addition, a network interface controller (NIC) 616 may be adapted to connect the computing device 600 through the system interconnect 606 to the network 618. In some embodiments, the NIC 616 can transmit data using any suitable interface or protocol, such as the internet small computer system interface, among others. The network 618 may be a cellular network, a radio network, a wide area network (WAN), a local area network (LAN), or the Internet, among others. An external computing device 620 may connect to the computing device 600 through the network 618. In some examples, external computing device 620 may be an external webserver 620. In some examples, external computing device 620 may be a cloud computing node.

The processor 602 may also be linked through the system interconnect 606 to a storage device 622 that can include a hard drive, an optical drive, a USB flash drive, an array of drives, or any combinations thereof. In some examples, the storage device may include a receiver module 624, a generator module 626, and an executer module 628. The receiver module 624 can receive an image ID corresponding to a container image of a container to be run. The receiver module 624 can then send the image ID to a registry. The receiver module 624 can receive an image metadata corresponding to the image ID from the registry. The receiver module 624 can further store the image metadata on a local file system. In some examples, the receiver module 624 can monitor and collect information corresponding to files within the container image. The receiver module 624 can detect access patterns based on the collected information. The receiver module 624 can further prefetch a range of image data based on the access patterns. In some examples, the receiver module 624 can also decompress files received from the registry using block compression and byte compression codecs.

The generator module 626 can generate a container including an application. In some examples, the generator module 626 may generate a container before image data corresponding to the container image is retrieved from the registry into the local storage. In some examples, image data may be prefetched. For example, the image data may be prefetched according to the example method 500 of FIG. 5 above.

The executer module 628 can execute the application using the image metadata. For example, the executer module 628 can read the image metadata on the local file system. The executer module 628 can detect that a range of data corresponding to the application is missing based on the image metadata. The executer module 628 can send a request for the range of data to the registry. In some examples, the executer module 628 compress files transferred to the registry using block compression and byte compression. The receiver module 624 may then receive image data corresponding to the range of data from the registry. In some examples, the receiver module 624 may download a plurality of image blocks from one or more sources in parallel. The receiver module 624 may also store the image data under the image ID in the local file system. The executer module 628 may then execute the application using the image data.

In some examples, the executor module 628 can generate a signature for a file from the container image that is stored in the local file system while executing the application. The executor module 628 can store the signature with received image data corresponding to the file from the registry in the local file system. In some example, the executor module 628 can then detect that a second file to be read comprises a signature that matches the stored signature. The executor module 628 can then read the received image data in the local file system to read the second file.

It is to be understood that the block diagram of FIG. 6 is not intended to indicate that the computing device 600 is to include all of the components shown in FIG. 6. Rather, the computing device 600 can include fewer or additional components not illustrated in FIG. 6 (e.g., additional memory components, embedded controllers, modules, additional network interfaces, etc.). Furthermore, any of the functionalities of the receiver module 624, the generator module 626, and the executer module 628, may be partially, or entirely, implemented in hardware and/or in the processor 602. For example, the functionality may be implemented with an application specific integrated circuit, logic implemented in an embedded controller, or in logic implemented in the processor 602, among others. In some embodiments, the functionalities of the receiver module 624, the generator module 626, and the executer module 628, can be implemented with logic, wherein the logic, as referred to herein, can include any suitable hardware (e.g., a processor, among others), software (e.g., an application, among others), firmware, or any suitable combination of hardware, software, and firmware.

Figure 7:
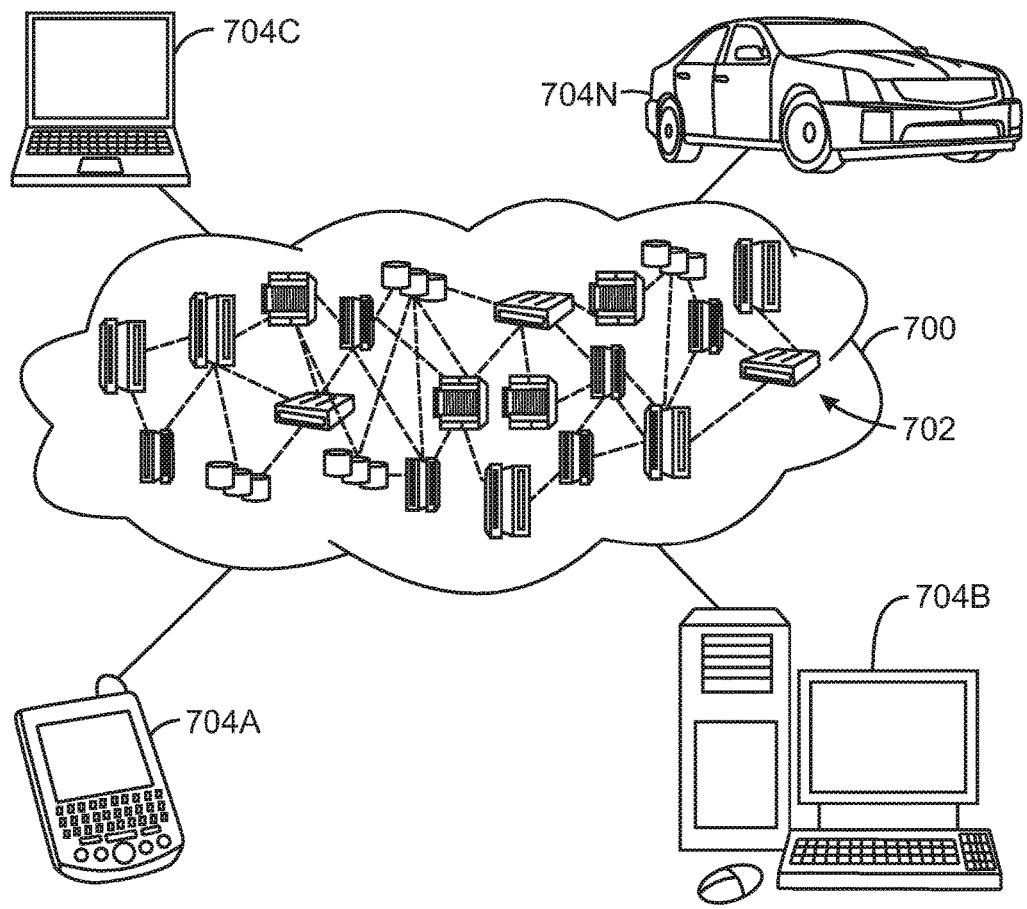
FIG. 7 is a block diagram of an example cloud computing environment according to embodiments described herein.

Referring now to FIG. 7, an illustrative cloud computing environment 700 is depicted. As shown, cloud computing environment 700 comprises one or more cloud computing nodes 702 with which local computing devices used by cloud consumers, such as, for example, personal digital assistant (PDA) or cellular telephone 704A, desktop computer 704B, laptop computer 704C, and/or automobile computer system 704N may communicate. Nodes 702 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 704A-N shown in FIG. 7 are intended to be illustrative only and that computing nodes 702 and cloud computing environment 700 can communicate with any type of computerized device over any type of network and/or network addressable connection (e.g., using a web browser).

Figure 8:
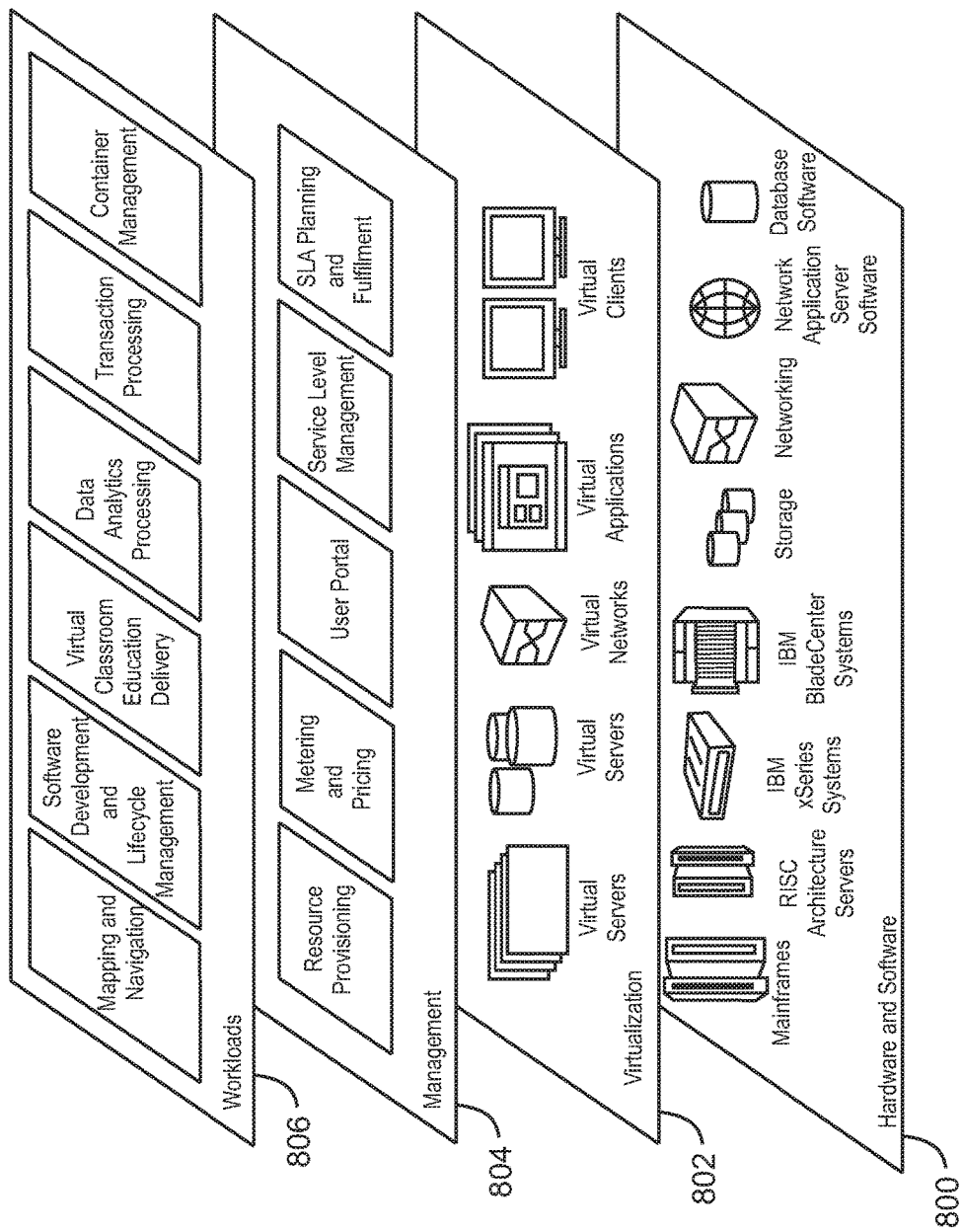
FIG. 8 is an example abstraction model layers according to embodiments described herein.

Referring now to FIG. 8, a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided.

Hardware and software layer 800 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 802 provides an abstraction layer from which the following examples of virtual entities may be provided: virtual servers; virtual storage; virtual networks, including virtual private networks; virtual applications and operating systems; and virtual clients. In one example, management layer 804 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 806 provides examples of functionality for which the cloud computing environment may be utilized. Examples of workloads and functions which may be provided from this layer include: mapping and navigation; software development and lifecycle management; virtual classroom education delivery; data analytics processing; transaction processing; and container management.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 9:
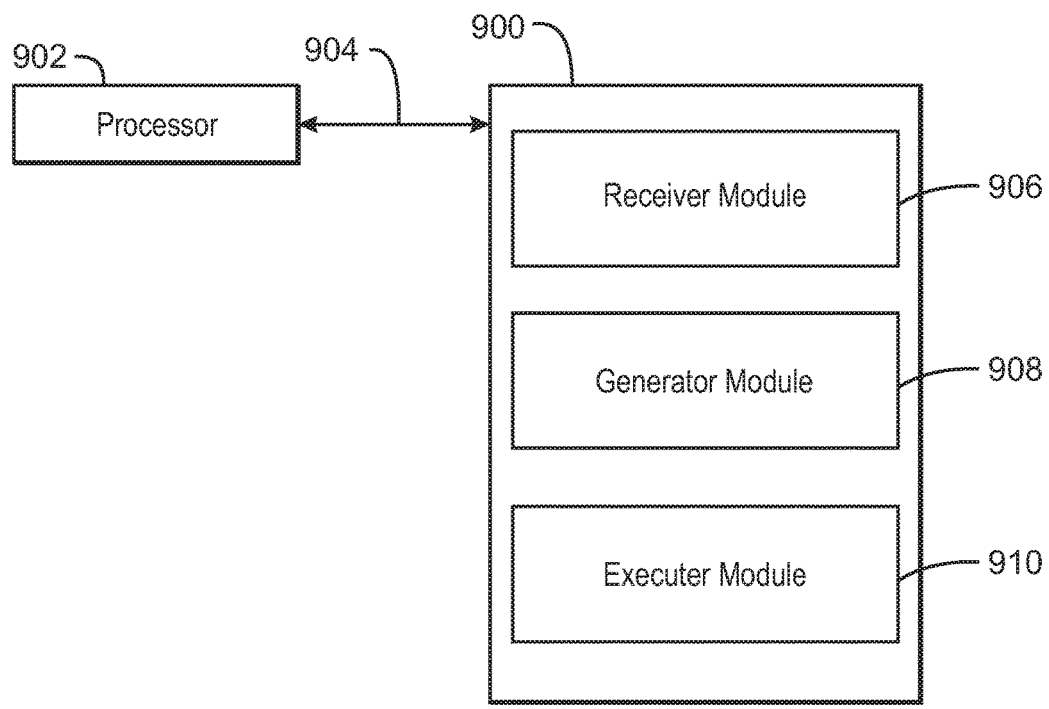
FIG. 9 is an example tangible, non-transitory computer-readable medium that can execute container applications using image metadata.

Referring now to FIG. 9, a block diagram is depicted of an example tangible, non-transitory computer-readable medium 900 that can execute container applications using image metadata. The tangible, non-transitory, computer-readable medium 900 may be accessed by a processor 902 over a computer interconnect 904. Furthermore, the tangible, non-transitory, computer-readable medium 900 may include code to direct the processor 902 to perform the operations of the methods 200-500 of FIGS. 2-5 above.

The various software components discussed herein may be stored on the tangible, non-transitory, computer-readable medium 900, as indicated in FIG. 9. For example, a receiver module 906 includes code to receive an image ID corresponding to a container image of a container to be run. The receiver module 906 also includes code to send the image ID to a registry. The receiver module 906 also includes code to receive an image metadata corresponding to the image ID from the registry. The receiver module 906 also includes code to store the image metadata on a local file system. In some examples, the receiver module 906 may include code to monitor and collect information corresponding to files within the container image. The receiver module 906 may also include code to detect access patterns based on the collected information. The receiver module 906 may include code to prefetch a range of image data based on the access patterns. In some examples, the receiver module 906 may include code to compress files transferred to the registry using block compression and byte compression. In some examples, the receiver module 906 may include code to download a plurality of image blocks from one or more sources in parallel. A generator module 908 includes code to generate a container including an application. An executer module 910 includes code to execute the application using the image metadata. In some examples, the executer module 910 includes code to execute the application based on image data and application file system accesses. For example, at least some of the image data may have been cached in a local file system during a previous execution. The executer module 910 may use access patterns to precache files for use in executing the application. In some examples, the executer module 910 also includes code to read the image metadata on the local file system. In some examples, the executer 910 may include code to detect that a range of data corresponding to the application is missing based on the image metadata. In some examples, the executer 910 may include code to send a request for the range of data to the registry. The receiver module 906 may include code to receive image data corresponding to the range of data from the registry. The receiver module 906 may also include code to store the image data under the image ID in the local file system. The executer module 910 may include code to execute the application using the image data.

In some examples, the executer module 910 may include code to generate a signature for a file from the container image that is stored in the local file system while executing the application. The executer module 910 may include code to store the signature with received image data corresponding to the file from the registry in the local file system. The executer module 910 may include code to detect that a second file to be read includes a signature that matches the stored signature. The executer module 910 may include code to read the received image data in the local file system to read the second file. It is to be understood that any number of additional software components not shown in FIG. 9 may be included within the tangible, non-transitory, computer-readable medium 900, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive an image ID corresponding to a container image of a container to be run;
send the image ID to a registry;
receive an image metadata corresponding to the image ID from the registry;
store the image metadata on a local file system;
generate a container comprising an the application; and
execute the application using the image metadata, wherein to execute the application the processor is to:
read the image metadata on the local file system;
detect that a range of data corresponding to the application is missing based on the image metadata;
send a request for the range of data to the registry;
receive image data corresponding to the range of data from the registry;
store the image data under the image ID in the local file system; and
execute the application using the image data.

2. The system of claim 1, wherein the processor is to execute the application based on image data and application file system accesses.

3. The system of claim 1, wherein the processor is to:
generate a signature for a file from the container image that is stored in the local file system while executing the application;
store the signature with received image data corresponding to the file from the registry in the local file system;
detect that a second file to be read comprises a signature that matches the stored signature; and
read the received image data in the local file system to read the second file.

4. The system of claim 1, wherein the processor is to:
monitor and collect information corresponding to files within the container image;
detect access patterns based on the collected information; and
prefetch a range of image data based on the access patterns.

5. The system of claim 1, wherein the processor is to compress files transferred to the registry using block compression and byte compression.

6. The system of claim 1, wherein the processor is to download a plurality of image blocks from one or more sources in parallel.

7. A computer-implemented method, comprising:
receiving, via a processor, an image ID corresponding to a container image of a container to be run;
monitoring, via the processor, and collecting information corresponding to files within the container image;
detecting, via the processor, access patterns based on the collected information;
prefetching, via the processor, a range of image data based on the access patterns;
sending, via the processor, the image ID to a registry;
receiving, via the processor, an image metadata corresponding to the image ID from the registry;
storing, via the processor, the image metadata on a local file system;
generating, via the processor, a container comprising an application; and
executing, via the processor, the application using the image metadata.

8. The computer-implemented method of claim 7, wherein executing the application comprises:
reading, via the processor, the image metadata on the local file system;
detecting, via the processor, that a range of data corresponding to the application is missing based on the image metadata;
sending, via the processor, a request for the range of data to the registry;
receiving, via the processor, image data corresponding to the range of data from the registry;
storing, via the processor, the image data under the image ID in the local file system; and
executing, via the processor, the application using the image data.

9. The computer-implemented method of claim 7, comprising:

generating, via the processor, a signature for a file from the container image that is stored in the local file system while executing the application;

storing, via the processor, the signature with received image data corresponding to the file from the registry in the local file system;

detecting, via the processor, that a second file to be read comprises a signature that matches the stored signature; and reading, via the processor, the received image data in the local file system to read the second file.

10. The computer-implemented method of claim 7, comprising compressing files transferred to the registry using block compression and byte compression.

11. The computer-implemented method of claim 7, comprising decompressing files received from the registry using block compression and byte compression codecs.

12. The computer-implemented method of claim 7, comprising downloading a plurality of image blocks from one or more sources in parallel.

13. A computer program product for execution of container applications, the computer program product comprising a computer-readable storage medium having program code embodied therewith, wherein the computer readable storage medium is not a transitory signal per se, the program code executable by a processor to cause the processor to:

receive an image ID corresponding to a container image of a container to be run;

send the image ID to a registry;

receive an image metadata corresponding to the image ID from the registry;

store the image metadata on a local file system;

generate a container comprising an application; execute the application using the image metadata;

generate a signature for a file from the container image that is stored in the local file system while executing the application;

store the signature with received image data corresponding to the file from the registry in the local file system;

detect that a second file to be read comprises a signature that matches the stored signature; and read the received image data in the local file system to read the second file.

14. The computer program product of claim 13, comprising program code executable by the processor to execute the application based on image data and application file system accesses.

15. The computer program product of claim 13, comprising program code executable by the processor to:

read the image metadata on the local file system;

detect that a range of data corresponding to the application is missing based on the image metadata;

send a request for the range of data to the registry;

receive image data corresponding to the range of data from the registry;

store the image data under the image ID in the local file system; and execute the application using the image data.

16. The computer program product of claim 13, comprising program code executable by the processor to:

monitor and collect information corresponding to files within the container image;

detect access patterns based on the collected information; and prefetch a range of image data based on the access patterns.

17. The computer program product of claim 13, comprising program code executable by the processor to download a plurality of image blocks from one or more sources in parallel.

* * * * *